US008405929B2

(12) United States Patent
Ghaderi et al.

(10) Patent No.: US 8,405,929 B2
(45) Date of Patent: Mar. 26, 2013

(54) INHIBITING OXIDATION OF ORGANIC CONTAMINANTS IN A HARD DISK DRIVE (HDD)

(75) Inventors: Sahba Ghaderi, Morgan Hill, CA (US); John Martin Burns, San Jose, CA (US); Charles Hignite, San Jose, CA (US); Vedantham Raman, Morgan Hill, CA (US); Thomas Karis, Aromas, CA (US); Charles A. Brown, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 376 days.

(21) Appl. No.: 12/648,548

(22) Filed: Dec. 29, 2009

(65) Prior Publication Data
US 2011/0157747 A1 Jun. 30, 2011

(51) Int. Cl.
G11B 33/14 (2006.01)
(52) U.S. Cl. .................... 360/97.12; 360/97.22
(58) Field of Classification Search ..... 360/97.11–99.25
See application file for complete search history.

(56) References Cited

U.S. PATENT DOCUMENTS

| 4,701,375 | A | 10/1987 | Nishimatsu et al. |
| 5,612,838 | A | 3/1997 | Smith et al. |
| 5,718,942 | A | 2/1998 | Vurens et al. |
| 5,907,456 | A | 5/1999 | Khan et al. |
| 6,031,685 | A * | 2/2000 | French et al. ............ 360/97.11 |
| 6,916,531 | B2 | 7/2005 | Liu et al. |
| 6,995,121 | B1 | 2/2006 | Liu et al. |
| 7,195,828 | B2 | 3/2007 | Gunsel et al. |
| 7,579,304 | B2 | 8/2009 | Liu et al. |
| 2002/0037438 | A1 | 3/2002 | Takami |
| 2003/0203823 | A1 | 10/2003 | Navarrini et al. |
| 2006/0229218 | A1 | 10/2006 | Meo et al. |
| 2008/0304177 | A1 | 12/2008 | Hendriks et al. |

FOREIGN PATENT DOCUMENTS

| EP | 1712580 | 10/2006 |
| JP | 60167109 | 8/1985 |

OTHER PUBLICATIONS

Gupta, et al., "Technique to Measure Antioxidant Protection in Oil/Paste", *IBM Technical Disclosure Bulletin*, (Aug. 1984),1391.
Depalma, et al., "Selection of Load Bearing Particle Materials for Compatibility with Commonly Used Magnetic Media Lubricants", *IBM Technical Disclosure Bulletin*, (Feb. 1983),4553-4554.
Disclosed Anonymously, "An Antioxidant Additive to Perfluoropolyether Lubricants", *Research Disclosure Journal*, (Feb. 1987),1-3.

* cited by examiner

Primary Examiner — Allen Heinz

(57) ABSTRACT

An information storage system including an enclosure, a rotating data storage medium including a surface, a slider including an ABS and an airborne oxidizable contaminant disposed in the enclosure. The system also includes an antioxidant absorbed onto the surface of the data storage medium. The antioxidant inhibits oxidation of the oxidizable contaminants at an interface between the ABS and the rotating data storage medium.

18 Claims, 4 Drawing Sheets

INHIBITING OXIDATION OF ORGANIC CONTAMINANTS IN A HARD DISK DRIVE (HDD)

FIELD

Embodiments of the present technology relate generally to the field of data storage.

BACKGROUND

Organic contaminants within a hard disk drive (HDD) can cause the HDD to fail. For example, airborne contaminants such as but not limited to siloxanes and organo-metallics can decompose within the HDD and affect the writing and/or reading of data.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Technology and consumer demand forces HDDs to become smaller and smaller. As the size of the components within the HDD becomes smaller, the spacing between the components also becomes smaller. Accordingly, contaminants that caused little to no effect to an HDD are now causing damage to the HDD, if not failure of the HDD.

Contaminants can enter into the HDD during manufacturing or the contaminants can originate from the component materials within the HDD (e.g., outgassing). Contaminants can be a compound and/or a material. Common contaminants of one type are siloxanes (e.g., $[SiO(CH_3)_2]_n$) which can be volatile or semi-volatile in HDDs. In general, siloxanes have structures of alternating silicon and oxygen atoms with other atoms or group of atoms attached. Siloxanes can originate from the use of adhesive release liners, mold release agents, lubricants, and many other material and processes used in the manufacturing of the HDD or components of the HDD. However, if the siloxanes become affixed to the disk and/or head surface, they can oxidize and affect the transfer of data from and/or onto the disk and potentially cause HDD failure. In other words, siloxanes are tribochemically reacted to form silica or a material similar to silica deposit on the slider. The deposit can grow in size to increase the slider disk spacing, to cause a hard error, and drive failure.

Figure 1:
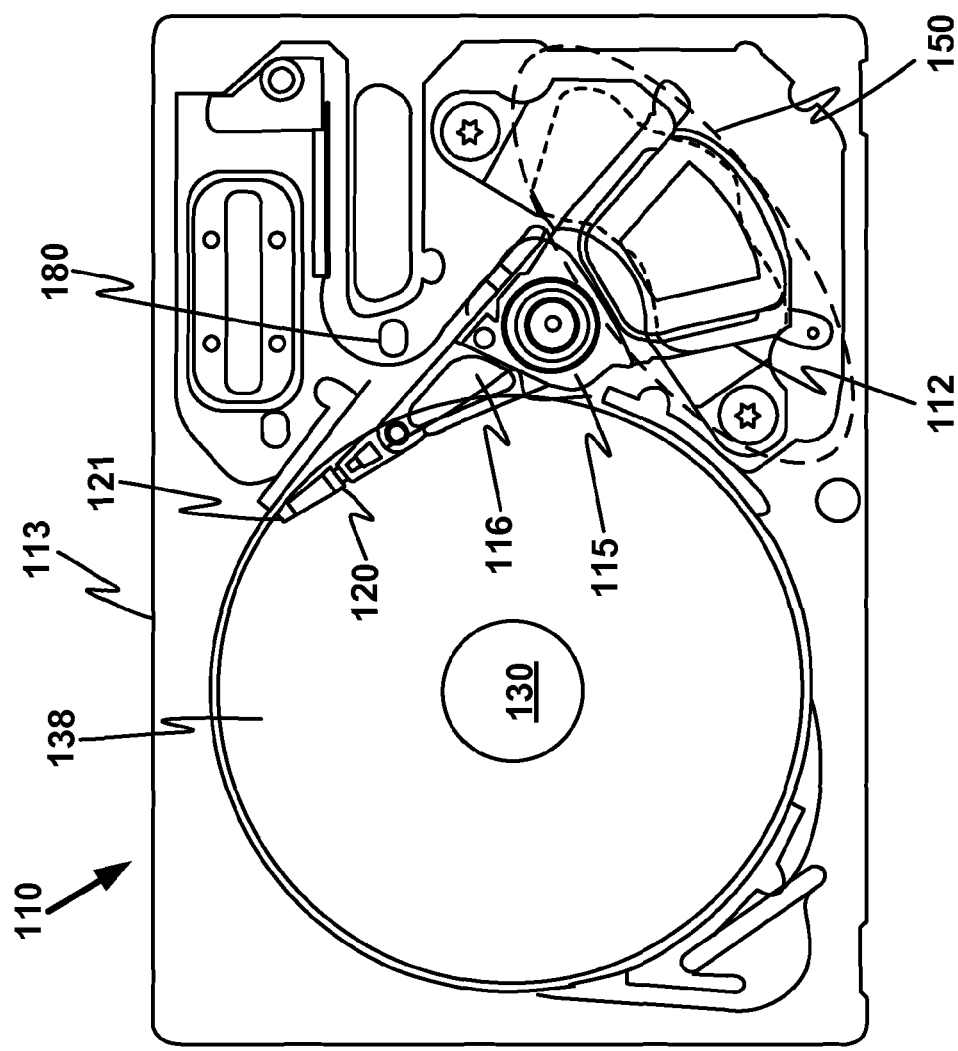
FIG. 1 illustrates an example of an HDD, in accordance with an embodiment of the present invention.

With reference now to FIG. 1, a schematic drawing of one embodiment of an information storage system including a magnetic hard disk file or HDD 110 for a computer system is shown, although only one head and one disk surface combination are shown. What is described herein for one head-disk combination is also applicable to multiple head-disk combinations. In other words, the present technology is independent of the number of head-disk combinations.

In general, HDD 110 has an outer sealed housing 113 usually including a base portion (shown) and a top or cover (not shown). The sealed housing 113 can also be referred to as enclosure. In one embodiment, housing 113 contains a disk pack having at least one media or magnetic disk 138. The disk pack (as represented by disk 138) defines an axis of rotation and a radial direction relative to the axis in which the disk pack is rotatable.

A spindle motor assembly having a central drive hub 130 operates as the axis and rotates the disk 138 or disks of the disk pack in the radial direction relative to housing 113. An actuator assembly 115 includes one or more actuator arms 116. When a number of actuator arms 116 are present, they are usually represented in the form of a comb that is movably or pivotally mounted to base/housing 113. A controller 150 is also mounted to base 113 for selectively moving the actuator arms 116 relative to the disk 138. Actuator assembly 115 may be coupled with a connector assembly, such as a flex cable to convey data between arm electronics and a host system, such as a computer, wherein the HDD 110 resides.

In one embodiment, each actuator arm 116 has extending from it at least one cantilevered integrated lead suspension (ILS) 120. The ILS 120 may be any form of lead suspension that can be used in a data access storage device. The level of integration containing the slider 121, ILS 120, and read/write head is called the Head Gimbal Assembly (HGA).

The ILS 120 has a spring-like quality, which biases or presses the air-bearing surface of slider 121 against disk 138 to cause slider 121 to fly at a precise distance from disk 138. The distance between the slider 121 and the disk 138 is the fly height. ILS 120 has a hinge area that provides for the spring-like quality, and a flexing cable-type interconnect that supports read and write traces and electrical connections through the hinge area. A voice coil 112, free to move within a conventional voice coil motor magnet assembly is also mounted to actuator arms 116 opposite the head gimbal assemblies. Movement of the actuator assembly 115 by controller 150 causes the head gimbal assembly to move along radial arcs across tracks on the surface of disk 138. In one embodiment, HDD 110 includes a diffuser 180 for diffusing an antioxidant within the HDD to inhibit oxidation of contaminants as described in detail below.

Figure 2:
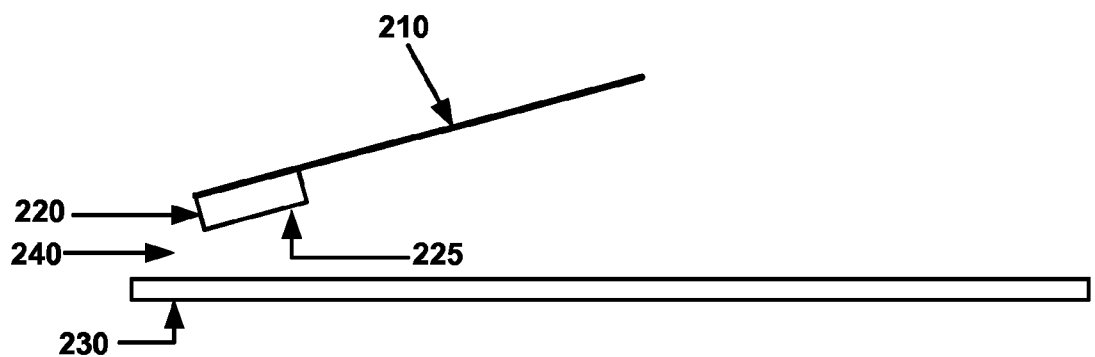
FIG. 2 illustrates an example of components in an HDD, in accordance with an embodiment of the present invention.

FIG. 2 depicts an ILS 210, a slider 220 and a disk 230. An air bearing surface (ABS) 225 is the surface of the slider facing the disk 230. The ABS 225 facilitates in controlling the fly height 240 of the slider 220 above the disk 230.

The fly height 240 is critical in the performance of the HDD. The fly height 240 has very tight tolerances and if contaminants accumulate on the ABS or about the read/write elements (e.g., ABS, slider, magnetic head), the fly height can be altered and go beyond the tight tolerances. If the fly height 240 is too high then the read/write signal and/or the signal-to-noise ratio (SNR) is reduced. The increase in fly height can also result in loss of data bits, unrecoverable "hard" errors and ultimately in flight instability and catastrophic head crash onto the disk 230.

Accumulation of contaminants (known as smears) on the ABS 225 can occur in different ways. Direct accumulation of solid contaminants without changing form can occur, and direct accumulation of solid contaminants with a physical change in form such as melting can occur. Direct accumulation of liquids can also occur, typically with a change in physical form.

Accumulation of contaminants on the ABS can also occur when there is a chemical reaction, typically an oxidation reaction, that results in the formation of reaction products that remain on the ABS. Examples of chemical reactions that result in accumulation of contaminants on the ABS are the reaction of silanes, alkoxysilanes, and siloxanes to form solid silicon oxides. Both liquid and vapor forms of silanes, alkoxysilanes, siloxanes, can chemically react to form silicon oxides.

An embodiment inhibits chemical reactions of compounds and materials inside the HDD that can contribute to the formation or accumulation of contaminants on the ABS of the slider. This embodiment is not limited to compounds that contain silicon, but includes all organo-metallic compounds such as organo-tin compounds. It also includes all compounds that can undergo chemical reaction inside the HDD, including compounds and materials that do not contain metals.

Vapors from contaminants (e.g., siloxanes) can adhere or condense onto the surface of the rotating disks, interact with the disk lubricant, be lifted or picked up by the heads, degrade, decompose and oxidize to form viscous or solid substances (i.e., smears or Si-smears). In one embodiment, organo-metallics (e.g., organo-tin compounds) are contaminants that decompose and oxidize to form viscous or solid substances. In another embodiment, vapors from all volatile disk drive contaminants can adhere or condense onto the surface of the rotating disks and/or the heads.

The process of oxidizing contaminants can be accelerated by heat and/or catalytic phenomena, such as but not limited to free radical ions from a fluorinated disk lubricant or metals (e.g., cobalt) and their oxides from the disk media. Chemical composition of the resulting Si smears has the general formulation of SiCFO with various and often undetermined stoichiometric values. The final product of the contaminant degradation is commonly referred to as SiOx and exhibits the characteristics of a solid, hard and stable species. It should be appreciated that intermediate oxidation of siloxanes produces $(SiO_xCH_2)_y$ and $SiO_xH$.

To inhibit the oxidation of compounds and materials, an antioxidant is placed into the HDD. The antioxidant is in the form of a liquid, vapor or solid with sufficient vapor pressure such that it diffuses inside the HDD and is absorbed onto the disk and slider surfaces. It should be appreciated that the antioxidant not be able move around the HDD as liquid droplets, aerosol or particulate matter to cause any undesirable head/disk interactions. In one embodiment, the antioxidant is an organic oxygen scavenger and/or free radical scavenger. It should be appreciated that the antioxidant inhibits oxidation of compounds and materials.

An antioxidant doping agent can be a hindered phenolic type agent. In one embodiment, the antioxidant agent is Irganox (e.g., Irganox 1135, L135, 1076, or Metilox) by Ciba Corp. In another embodiment, the antioxidant agent is an aromatic amine (e.g., phenyl naphthylamine). In another embodiment, the antioxidant agent is a thiol. It should be appreciated that the antioxidant agent can be any compound with appropriate vapor pressure that hinders oxidation reactions. In one embodiment, the antioxidant agent is Irganox 1135 with a vapor pressure of approximately 0.2 torr at 25 degrees Celcius.

The antioxidant agent is disposed inside the HDD and delivered to the interface between the disk and read/write elements in a variety of methods. In one embodiment, the antioxidant agent is placed in a cavity in the base casting of the HDD. In another embodiment, the antioxidant agent is disposed inside a reservoir with a soaking element. In a further embodiment, the antioxidant agent is incorporated into the construction of one of the HDDs components (e.g., vapor drain, recirculation filter, desiccant or any other polymeric part). In one embodiment, the antioxidant agent is delivered to an interface between the ABS 225 and the disk 230.

In one embodiment, the antioxidant agent, which could be volatile or non-volatile, is chemically attached to a disk lubricant, as an end group, making the antioxidant agent available and active at all times on the disk surface. The antioxidant is delivered to the slider/disk interface by lubricating the disk(s) with a lubricant that contains an antioxidant molecule. The antioxidant molecule can be covalently attached to the perfluoropolyether (PFPE) polymer chain.

In one embodiment, the antioxidant may be chemically attached to the disk lubricant by combining (1) 5.58 grams of Ztetraol 2000S in 43 grams of HFE-7100 and (2) 2 grams of Irganox L135 in 1 gram of hexane. Accordingly, some of the hydroxyl groups on the Ztetraol being esterified with the antioxidant group 3-(3,3-di-tert-butyl-4-hydroxyphenyl)propanoic acid. The end result is an antioxidant modified lubricant Ztetraol 20005-AOX. In that example, the molar ratio of lubricant hydroxyl end groups to antioxidant may be about 10.5 to 1.0 or about 9% of the lubricant hydroxyl groups esterified with the antioxidant.

A disk can be dip coated with the antioxidant modified lubricant from 0.01 weight (wt) % solution in HFE-7100, which deposits about 1 nanometer (nm) of lubricant on the disk at a withdrawal rate of 5 nm/sec. It should be appreciated that a variety of antioxidants (e.g., aromatic amine, polyaromatic amine, or any type of amine in combination with phenolic compound(s)) may be attached to the disk lubricant (e.g., Zdol, ZTMD, or any perfluoropolyether polyol) in a variety of ways.

Figure 3:
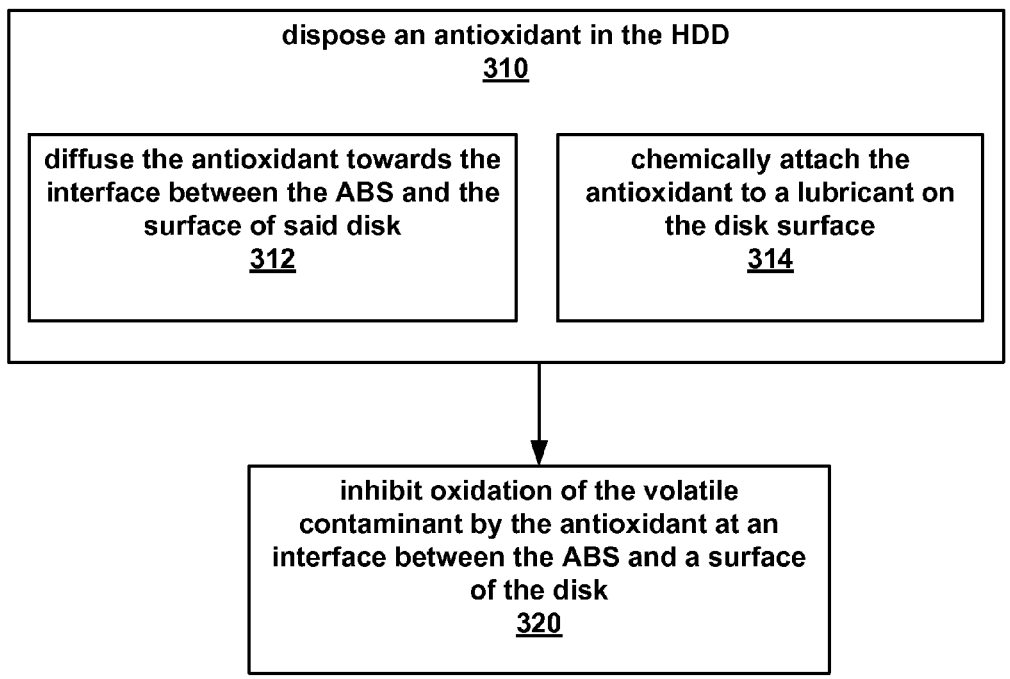
FIG. 3 illustrates an example of a flow chart of a method for inhibiting oxidation of an airborne contaminant in a HDD, in accordance with an embodiment of the present invention.

FIG. 3 illustrates a flow chart of a method 300 for inhibiting oxidation of a volatile compound or material in a HDD, in accordance with an embodiment of the present invention. In one embodiment, method 300 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In one embodiment, method 300 is performed at least by the system of FIG. 1.

At step 310 of method 300, an antioxidant is disposed in the HDD. In one embodiment, at step 312 the antioxidant is diffused towards the interface between the ABS and the surface of the disk. For example, the antioxidant is disposed separate and apart from the interface between the ABS and the surface of the disk. Diffusion and/or air circulation inside the HDD caused by the rotation of the disk causes the antioxidant to travel towards the interface between the ABS and the surface of the disk. In another embodiment, at step 314, the antioxidant is chemically attached to a lubricant on the disk surface. For example, an antioxidant (e.g., Irganox L135, or better, the acid portion of it—as mentioned in paragraph 0028, page 10) is chemically attached to a disk lubricant (e.g., PFPE). In a further embodiment, the antioxidant selected from a group consisting of: organic oxygen scavengers, free radical scavengers, hindered phenolics, aromatic amines, phenyl napthylamines and thiols.

At step 320, oxidation of the volatile compound or material is inhibited by the antioxidant at an interface between the ABS and a surface of the disk. In one embodiment, oxidation of siloxanes is inhibited. In another embodiment, oxidation of organo-metallics (e.g., organo-tin compounds) is inhibited. In a further embodiment, formation of silicon oxide caused by oxidation of contaminants is inhibited.

Figure 4:
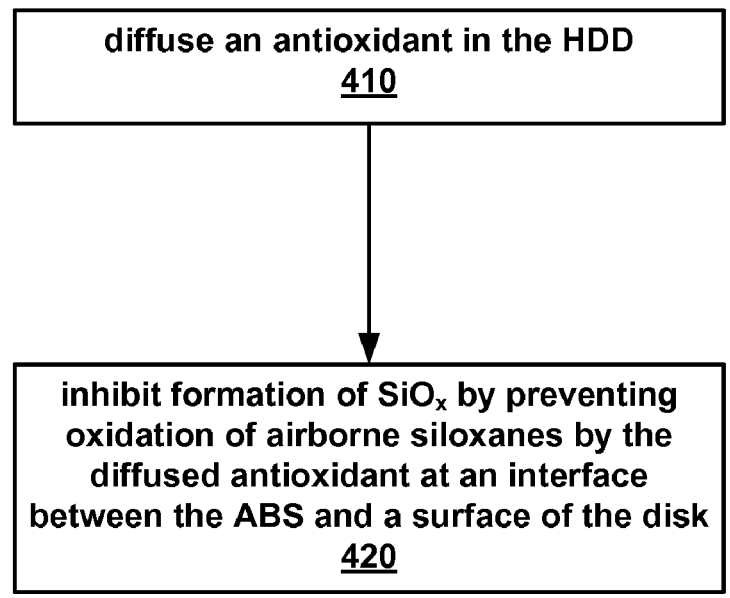
FIG. 4 illustrates an example of a flow chart of a method for inhibiting oxidation of an airborne contaminant in a HDD, in accordance with an embodiment of the present invention.

FIG. 4 illustrates a flow chart of a method 400 for inhibiting oxidation of an airborne contaminant in a HDD, in accordance with an embodiment of the present invention. In one embodiment, method 400 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In one embodiment, method 400 is performed at least by the system of FIG. 1.

At step 410 of method 400, an antioxidant is diffused in the HDD. In embodiment, the antioxidant is selected from a group consisting of: organic oxygen scavengers, free radical scavengers, hindered phenolics, aromatic amines, phenyl napthylamines and thiols.

At step 420, formation of $SiO_x$ is inhibited by inhibiting oxidation of airborne siloxanes by the diffused antioxidant at an interface between the ABS and a surface of the disk.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims

What is claimed:

1. An information storage system comprising:
    an enclosure;
    a rotating data storage medium comprising a surface;
    a slider comprising an air bearing surface (ABS);
    an airborne oxidizable contaminant disposed in said enclosure;
    an antioxidant diffuser, wherein said antioxidant diffuser diffuses said antioxidant within said enclosure; and
    an antioxidant absorbed onto said surface of said data storage medium, wherein said antioxidant inhibits oxidation of said oxidizable contaminant at an interface between said ABS and said rotating data storage medium.

2. The system of claim 1, wherein said airborne oxidizable contaminant comprises:
    siloxanes.

3. The system of claim 1, wherein said airborne oxidizable contaminant comprises:
    organo-metallics.

4. The system of claim 3, wherein said organo-metallics comprises:
    organo-tin compounds.

5. The system of claim 1, wherein said airborne oxidizing contaminant comprises:
    volatile contaminants.

6. The system of claim 1, wherein said antioxidant comprises:
    an antioxidant selected from a group consisting essentially of: an organic oxygen scavengers, a free radical scavengers, a hindered phenolics, an aromatic amines, phenyl napthylamines and thiols.

7. The system of claim 1, comprising:
    a lubricant disposed on said surface of said data storage medium, wherein said antioxidant is chemically attached to said lubricant.

8. The system of claim 1, wherein said antioxidant comprises:
    a vapor pressure of 0.2 torr.

9. A method for inhibiting oxidation of contamination in a hard disk drive (HDD), wherein said HDD comprises a disk and a slider comprising an air bearing surface (ABS), said method comprising:
    diffusing an antioxidant in said HDD; and
    inhibiting formation of $SiO_x$ by inhibiting oxidation of airborne siloxanes by said diffused antioxidant at an interface between said ABS and a surface of said disk.

10. The method of claim 9, wherein said diffusing an antioxidant comprises:
    diffusing an antioxidant selected from a group consisting of: organic oxygen scavengers, free radical scavengers, hindered phenols, aromatic amines, phenyl napthylamines, and thiols.

11. A method for inhibiting oxidation of a volatile contaminant in a hard disk drive (HDD), wherein said HDD comprises a disk and a slider comprising an air bearing surface (ABS), said method comprising:
    disposing an antioxidant in said HDD, wherein said disposing said antioxidant comprises:
        chemically attaching said antioxidant to a lubricant on said disk surface; and
    inhibiting oxidation of said volatile contaminant by said antioxidant at an interface between said ABS and a surface of said disk.

12. The method of claim 11, wherein said inhibiting oxidation of said volatile contaminant comprises:
    inhibiting oxidation of organo-metallics.

13. The method of claim 12, wherein said inhibiting oxidation of said organo-metallics comprises:
    inhibiting oxidation of organo-tin compounds.

14. The method of claim 11, wherein said inhibiting oxidation of said volatile contaminant comprises:
    inhibiting formation of silicon oxide ($SiO_x$).

15. The method of claim 11, wherein said disposing an antioxidant in said HDD comprises:
    disposing an antioxidant in said HDD selected from a group consisting of: organic oxygen scavengers, free radical scavengers, hindered phenols, aromatic amines, phenyl napthylamines, and thiols.

16. The method of claim 11, comprising:
    diffusing said antioxidant towards said interface between said ABS and said surface of said disk.

17. The method of claim 11, wherein said inhibiting oxidation of said volatile contaminant comprises:
    inhibiting oxidation of siloxanes.

18. The method of claim 11, wherein said disposing said antioxidant comprises:
    disposing an antioxidant modified perfluoropolyether (PFPE) lubricant on said surface of said disk.

* * * * *